(No Model.) 2 Sheets—Sheet 1.
T. C. MUNZ.
COUPLING FOR RODS.
No. 581,917. Patented May 4, 1897.
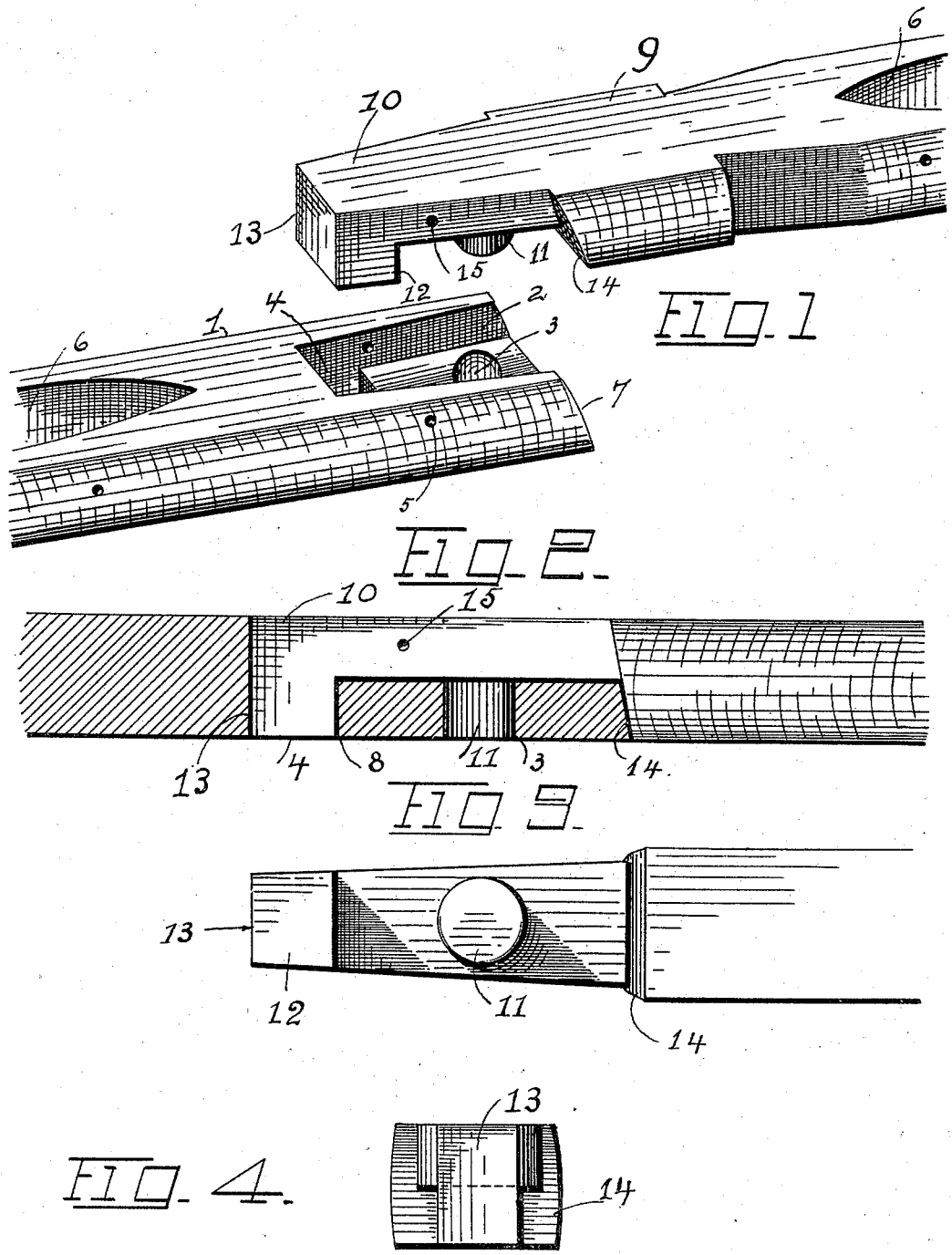
WITNESSES
H. H. Martin
Maud Schumacher.
INVENTOR
Theodore C. Munz
By William Webster
Atty
THE NORRIS PETERS CO., PHOTO-LITHO., WASHINGTON, D. C.

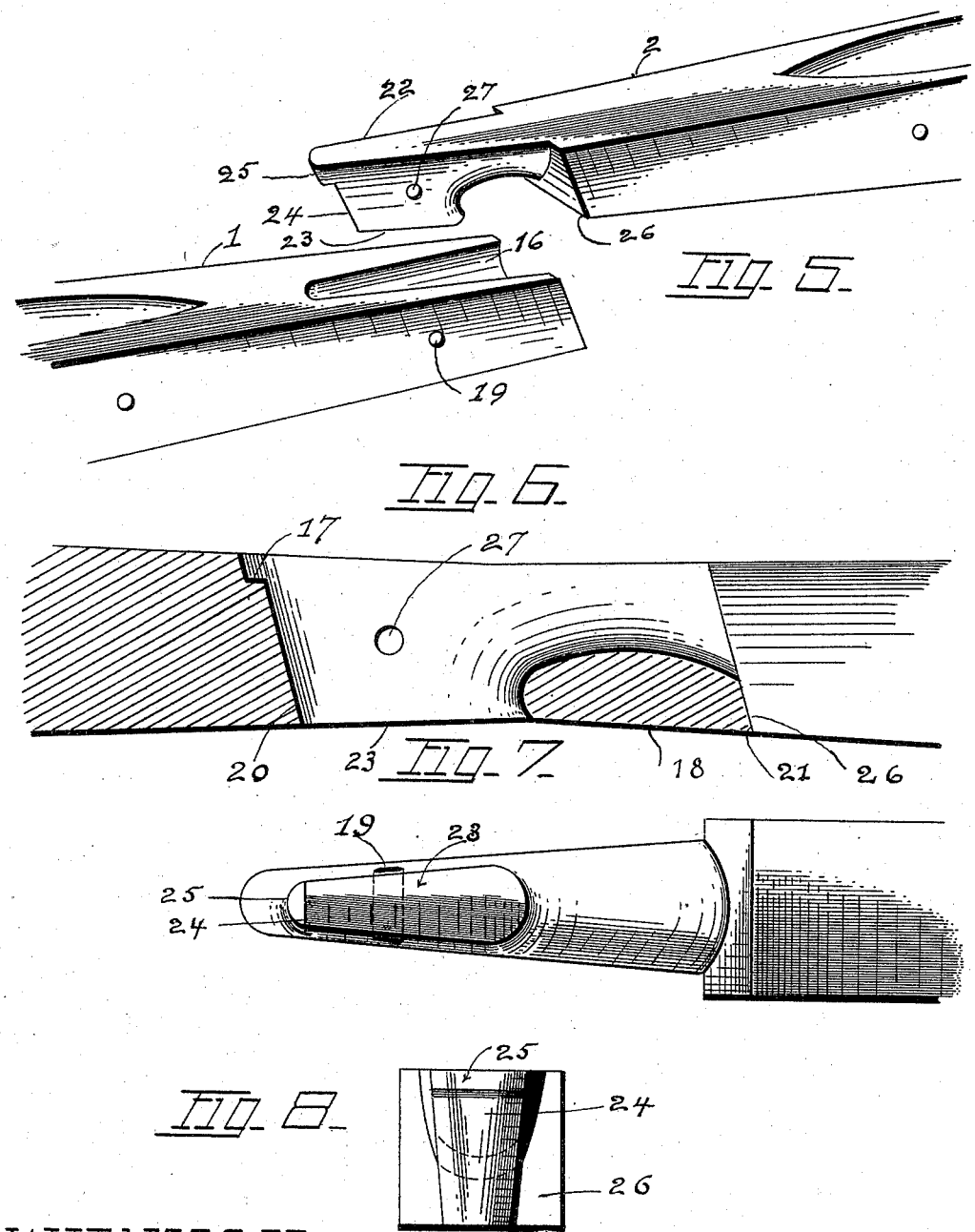

UNITED STATES PATENT OFFICE.

THEODORE C. MUNZ, OF TOLEDO, OHIO.

COUPLING FOR RODS.

SPECIFICATION forming part of Letters Patent No. 581,917, dated May 4, 1897.

Application filed January 27, 1897. Serial No. 620,961. (No model.)

*To all whom it may concern:*

Be it known that I, THEODORE C. MUNZ, of Toledo, county of Lucas, and State of Ohio, have invented certain new and useful Improvements in Couplings for Rods; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a coupling for rods, having especial relation to a coupling for rods employed in oil-wells, and has for its object to provide a coupling that shall be inexpensive in construction and easily coupled or uncoupled, with especial relation to a firm union of the parts when assembled, whereby in the reciprocatory movement the union shall be firm and without play vertically, and also the rotary movement shall be compensated for.

In the drawings, Figure 1 is a detached side elevation of the two parts ready for assemblage. Fig. 2 is a longitudinal vertical section of the parts assembled. Fig. 3 is a top plan view of one of the sections, showing the two insertible keepers. Fig. 4 is a front end elevation. Figs. 5, 6, 7, and 8 are in illustration of an obvious modification of my invention in which the construction is adaptable for like and various other uses, in which Fig. 5 is a side elevation of the two parts of the coupling slightly detached. Fig. 6 is a sectional side elevation of the parts assembled. Fig. 7 is a top plan view of one of the sections, and Fig. 8 is a sectional end view showing the parts assembled.

In the branch of the art to which my invention belongs more particularly—to wit, that of coupling sections of rods for deep wells, such as oil-wells—it is necessary to provide for convenience of coupling sections to be added and uncoupling sections to be removed. Various devices of this character have been invented having more or less merit, and the present invention is designed as a radical improvement in the state of the art.

I have first provided for a cuneal formation of the male and female parts, whereby, when the parts are assembled, there is an entire avoidance of vertical movement, due to the impact of a quick reciprocation. I have also provided for an inclination transversely upon coincident sides of the two parts, whereby in assembling the parts are drawn into close relation. I have also provided coincident right-angled parts to be coactively assembled at right angles to the line of rod, so that in the assembled relation of parts there is a direct impact of the two squared ends, a drawing movement of the angled portions, and a closely-assembled relation of the cuneal parts with a transverse pin passing through the wall of the female portion and the body of the male portion to hold the parts in their closely-assembled relation.

1 designates a section of coupling, as shown in Figs. 1, 2, 3, and 4, having a cuneiform recess 2, provided with a circular opening 3 and a rectangular opening 4, with transverse perforations 5, the upper end of the coupling being bifurcated to provide forks 6, which extend to a proper length to allow of coupling with the rods. The end of section 1 is inclined, as at 7, and the wall of the opening 4 is at a right angle to the body of the coupling, as at 8.

Section 9 is formed with a cuneal portion 10 to closely fit the cuneiform recess of section 1 and has a circular projection 11 that fits closely in the opening 3, with a rectangular projection 12, having a wall 13 at right angles to the body of the coupling, which coincides with the angled wall 8 of section 1, whereby, when the two sections are assembled, the tendency of the inclined portion 14 of coupling 2, when in coincidence with the angle 7 of section 1, is to draw the parts into close relation, after which a pin is inserted into the perforations 5 of section 1 and passes through a perforation 15 of coupling 2 to assist in holding the parts when tortionally strained in the necessary revolution in the operation of the sucker-rod or other rod to which the coupling is applied. In the modified form shown in Figs. 5, 6, 7, and 8 the section 1 is formed with a cuneiform recess 16, having a shoulder 17 and an integral lug or projection 18, with perforations 19, similar to the perforations 5 heretofore described, with an inclined wall 20 extending from the shoulder 17 to the base, and with an inclined shoulder 21 upon the outer end.

Section 2 is formed with a cuneal portion 22 and a projecting lug 23, having an inclined end portion 24 and an extension 25 to seat into the recess extending beyond the shoulder 17 and to rest upon the shoulder 17, with an inclined portion 26 to coincide with the inclined shoulder 21 of section 1, and a perforation 27, which coincides with the perforation 19 of section 1 when the parts are assembled to receive a locking-pin to assist in holding the parts from torsion when a revoluble strain is exerted.

It will be seen by the foregoing that I have provided the coupling ends of sections with means for close assemblage without the possibility of separation or effect of impact and that they are easily connected or disconnected.

I consider the feature of the cuneiform recess and the cuneal projection with the vertical wall of the two sections to receive the impact and the inclined walls of the two sections to insure close assemblage as of vital importance in the branch of the art to which my invention belongs.

What I claim is—

In a coupling for rods, a section provided with a cuneal recess, an inclined end to the wall, a recess formed with a shoulder, and a section having a cuneal end projection with a depending portion to fit the recess and abut against the wall, and an inclined portion coincident with the inclination of the first section, and a transverse perforation extending through both sections and coincident when assembled with a pin extending through the perforation.

In testimony that I claim the foregoing as my own I hereby affix my signature in presence of two witnesses.

THEODORE C. MUNZ.

Witnesses:
WILLIAM WEBSTER,
MAUD SCHUMACHER.